Sept. 23, 1924.

C. REXROAT

TRACTION WHEEL

Filed Oct. 16, 1923

C. Rexroat
INVENTOR

BY Victor J. Evans
ATTORNEY

WITNESS:

Sept. 23, 1924.

C. REXROAT

TRACTION WHEEL

Filed Oct. 16, 1923

C. Rexroat
INVENTOR

BY Victor J. Evans
ATTORNEY

WITNESS:

Sept. 23, 1924.  
C. REXROAT  
TRACTION WHEEL  
Filed Oct. 16, 1923

C. Rexroat  
INVENTOR  
BY Victor J. Evans  
ATTORNEY

WITNESS:

Patented Sept. 23, 1924.

1,509,779

UNITED STATES PATENT OFFICE.

CHARLES REXROAT, OF BEARDSTOWN, ILLINOIS.

TRACTION WHEEL.

Application filed October 16, 1923. Serial No. 668,867.

*To all whom it may concern:*

Be it known that I, CHARLES REXROAT, a citizen of the United States, residing at Beardstown, in the county of Cass and State of Illinois, have invented new and useful Improvements in Traction Wheels, of which the following is a specification.

The object of this invention is the production of a traction wheel provided with calks movable for projection beyond the wheel rim when wheel is travelling over soft surfaces and likewise movable inward of the wheel to provide the same with a smooth periphery or rim when the device travels over concrete or similar smooth surfaces, and in which simple means is provided for locking the calks in either of said positions.

The invention also resides in other features of construction and the combination and operative arrangement of elements to be hereinafter fully described in the following description and specifically pointed out in the appended claims.

In describing the invention in detail reference is to be had to the accompanying drawings wherein like characters denote like or corresponding parts throughout the several views, and in which:—

Figure 1:
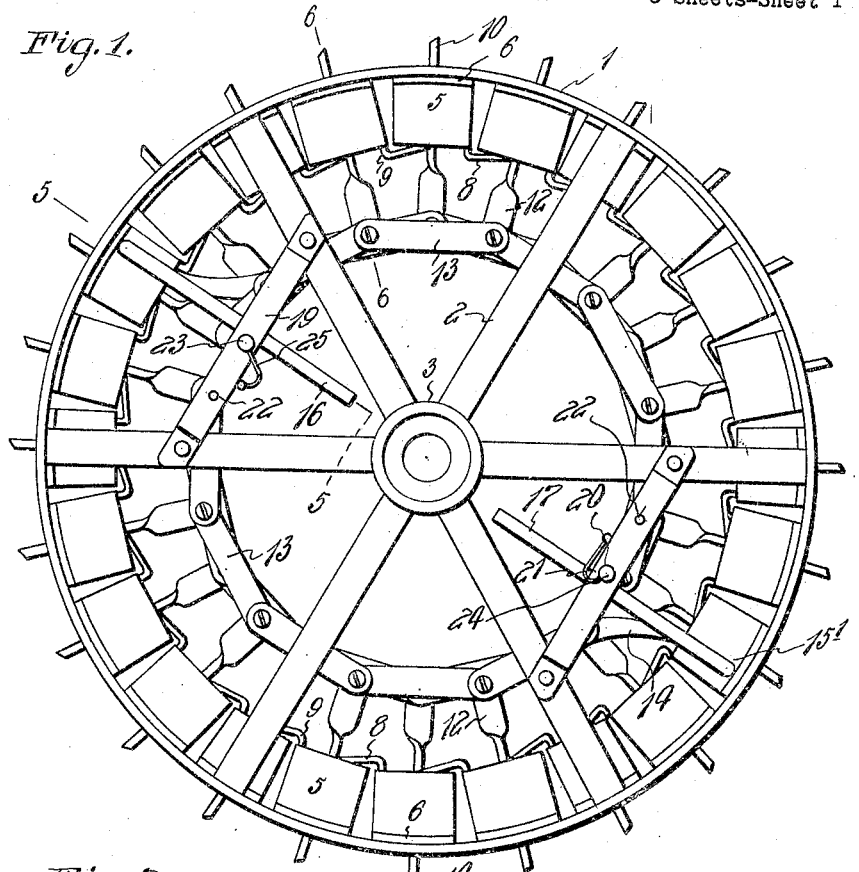
Figure 1 is a side elevation of a wheel in accordance with this invention the calks being projected.
Figure 2:
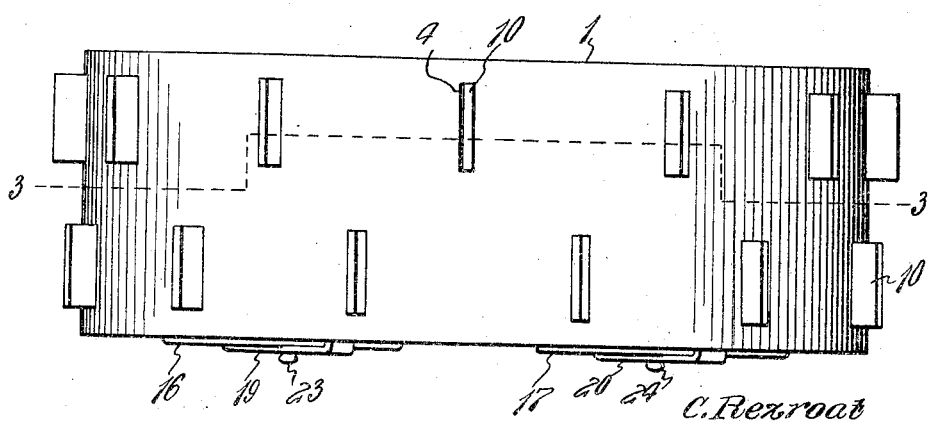
Figure 2 is a face view thereof.
Figure 3:
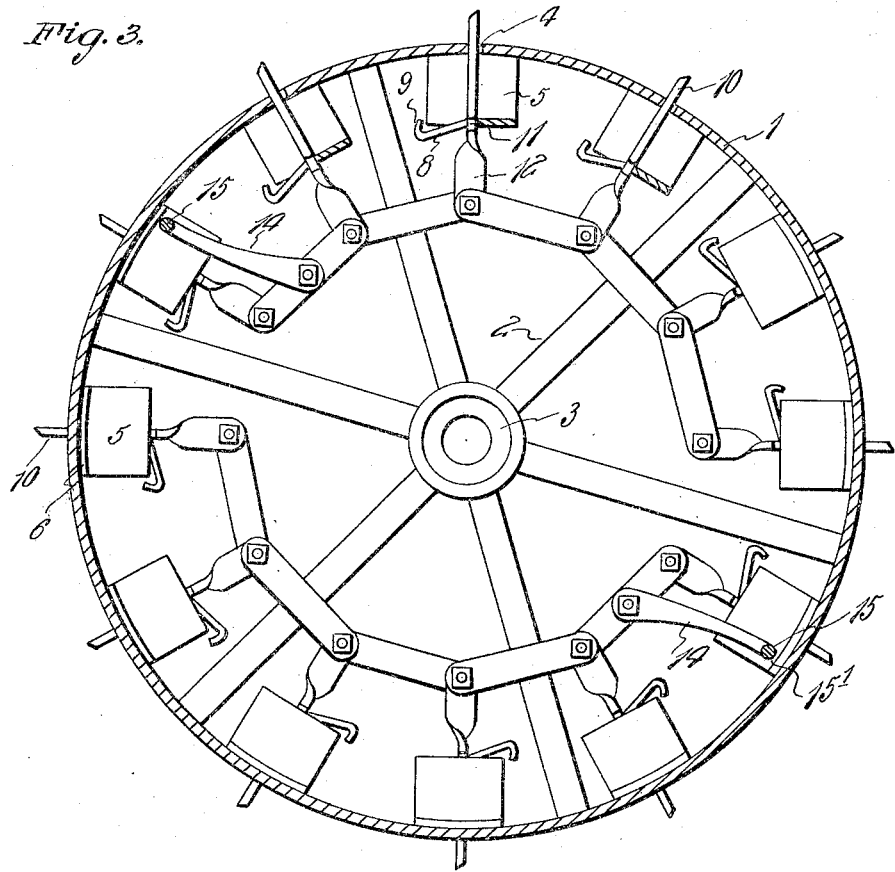
Figure 3 is a sectional view approximately on the line 3—3 of Figure 2.
Figure 6:
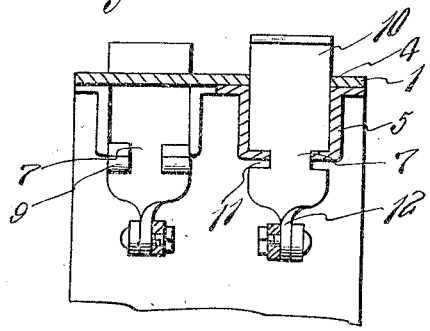
Figure 6 is a sectional view on the line 6—6 of Figure 1.
Figure 8:
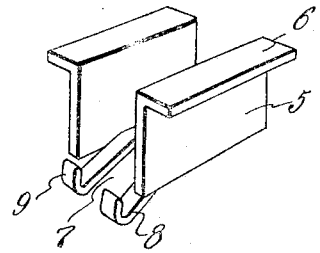
Figure 8 is a similar view of the housing for the calk.
Figure 4:
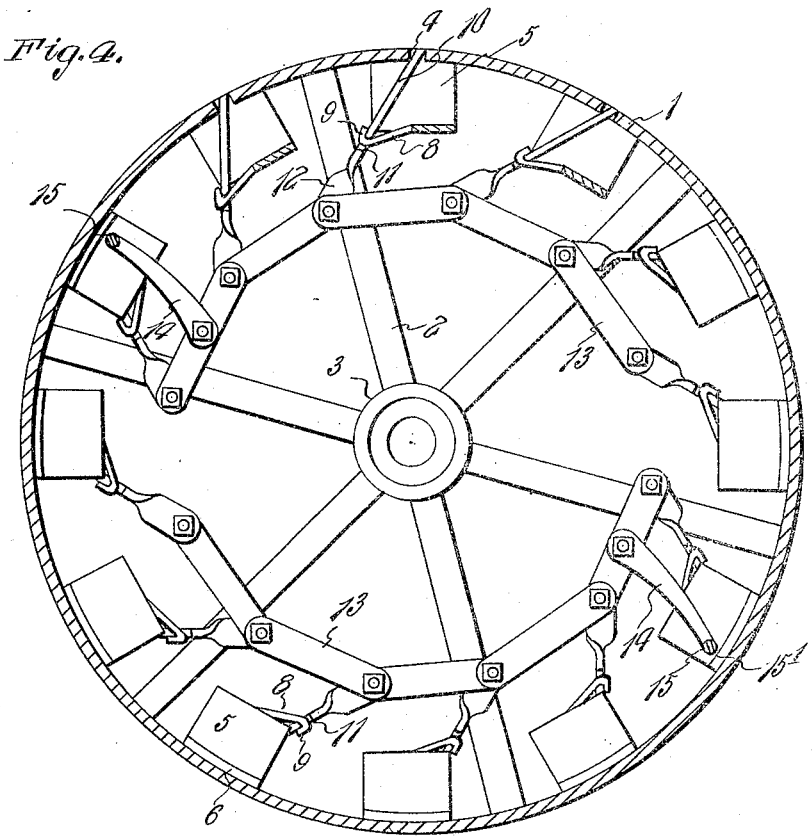
Figure 4 is a substantially similar view with the calks in retracted member position.
Figure 5:
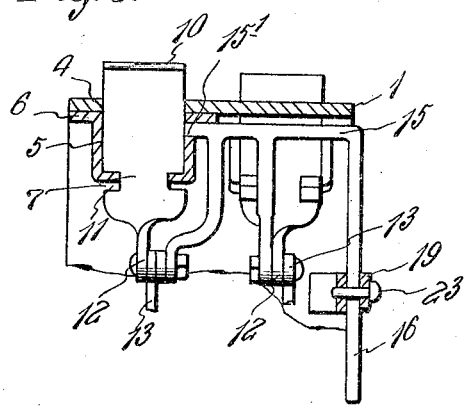
Figure 5 is a sectional view on the line 5—5 of Figure 1.
Figure 7:
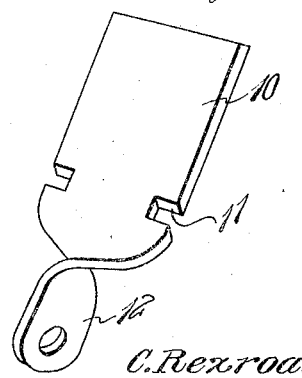
Figure 7 is a perspective view of one of the calks.

The tractor wheel is substantially of the ordinary construction, having a comparatively wide rim 1, radially disposed spokes 2 secured to the rim adjacent to the edges thereof and a hub 3 to which the spokes are connected.

The rim 1, at a suitable distance from its edges is provided with equi-distantly spaced transversely disposed slots 4. The slots are arranged in spaced series, the series adjacent one edge of the rim being disposed intermediate of the series adjacent to the opposite edge of the rim.

Secured on the inner face of the rim and bridging each of the slots 4 there is a substantially U-shaped housing 5. The sides of each of the housings are parallel and have their ends flanged outwardly, as at 6, and these flanges are secured on the rim. The inner or connecting wall for the sides of each housing is provided with a substantially rectangular opening entering from what I will term the rear end of the housing. The said bottom or connecting wall of the housing is slitted in a line with its sides. The parts between the opening 7 and the slits are bent at an outward angle to provide arms 8, and the ends of these arms are further bent to provide fingers 9 which are directed toward the rim 1.

By reference to the drawings it will be noted that the housings 5 are disposed centrally over the slots 4, and passing through the housings and received in each of the slots 4 there is a calk. Each calk has its body portion 10 flat and of a rectangular formation. The body of each calk is notched at its edges at points adjacent to the outer end thereof. The notches are indicated by the numerals 11 and permit of the calks moving through the opening 7 in the housings, the said notches receiving therein the arms 8 and being guided by contacting engagement therewith when projecting through the slots 4 and being likewise guided when retracted so that the outer shoulders provided by the notches will be received on the fingers 9 of the said guide arms 8 and when in such position the calks will be disposed at an inward angle with respect to the housings so that a free outward movement of the said calks through the slots 4 will be prevented. The outer ends of the calks are at all times received in the slots 4. The contacting engagement between the calks and the housing is such that the said calks will be sustained in either retracted or projected positions, but to positively prevent accidental movement of the calks I provide locking means which will hereinafter be described.

Inward of the housings the calks are preferably given a half twist to provide the same with what may be termed extending tongues 12. To these tongues there are pivotally connected links 13.

The links are also disposed in series that is the links connecting the calks arranged over approximately one-half of the circumference of the wheel have their opposed end members connected together by pivotally secured spaced arms 14 which are integrally formed on a shaft 15 journalled in a suitable bearing 15' on the inner periphery of the rim between two housings next to the inner edge of the rim.

Each of the shafts has its upper end extended at an inward angle to provide handles which for distinction are indicated by the numerals 16 and 17 respectively. Each handle is directed toward the hub of the wheel and passes through slotted brackets 19 and 20 respectively, secured to two of the spokes 2 on the said outer side of the wheel. The spaced arms provided by the slotted brackets 19 and 20 have aligning openings 21 and 22 respectively. Designed to pass through either pair of openings, in the respective brackets there are pins 23 and 24 respectively. Preferably the pins are suspended from the brackets by flexible elements 25. The openings in the brackets are arranged so that the pins will contact with one side of the handles 17 and 18 when the latter are swung to influence the links to project the calks and to be passed through the other opening in said bracket to contact with the opposite side of handles when the latter have been moved to influence the links to retract the calks.

With my improvement it will be noted that my wheel may be employed either upon smooth or rough road surfaces. The calks may be either projected or retracted by the simple swinging of the handles of the arm carrying shafts, and while I have herein set forth a satisfactory embodiment of my invention, I wish it understood that I am entitled to such changes therefrom as fall within the scope of what I claim.

Having described my invention, I claim:

1. A traction wheel having its rim provided, adjacent to its edges with series of spaced slots, the slots of one series being disposed intermediate of the slots of the other series, a housing secured on the inner face of the rim bridging each slot, a calk in each housing having its outer portion received in each slot, said calks, when in retracted position being disposed angularly in the housings and when in projected position having portions thereof resting against the inner wall of the housing, and means for moving the calks to either of said positions.

2. A traction wheel having its rim provided with spaced transverse slots arranged in staggered series adjacent to the edges of the rim, and a substantially U-shaped housing secured to the inner face of the rim and bridging each slot, each of said housings having its inner wall centrally cut away and formed with inclined arms which terminate inturned fingers arranged at the opposite sides of said cut away portions, a calk in each housing having its outer end received in each slot, the said calks having notched edges to receive the arms therethrough to permit of the calks being disposed angularly and resting on the fingers of the arms when in retracted position, and also whereby the notched portions of the calks will rest against the inner ends of the arms when in projecting position and means for moving the calks to either of said positions.

3. A traction wheel having its rim provided with transverse slots terminating inward of its center disposed in staggered relation to the opposite sides of the same, a substantially U-shaped housing secured on the inner face of the rim bridging each slot, a calk having its outer end in each slot and its body portion in each housing, means between the calk and housing for sustaining the said calk at an inward angle with respect to the housing when in retracted position, means for moving the calk to either projected or retracted positions, and means for holding the calk in either its projected or retracted positions.

4. A traction wheel having its rim provided with series of spaced slots, a housing on the inner face of the rim bridging each slot, a calk in each housing having its outer end received in each slot, means between the housings and calks for retaining the said calks angularly in the housings when in retracted position and for sustaining the calks in contacting engagement with the inner walls of the housings when in projecting positions, pivotally connected links which are likewise pivoted to the inner ends of the series of calks, diametrically opposed shafts journalled in bearings on the inner face of the rim and having spaced arms which are pivotally connected to the end links of the respective series, an angle extension providing a handle on the outer end of each shaft, a guide through which each handle passes and means for locking the handles on the guides when the latter are moved to influence the links to projecting or to retracting the calks.

In testimony whereof I affix my signature.

CHARLES REXROAT.